(12) United States Patent
Gerst et al.

(10) Patent No.: US 6,715,356 B2
(45) Date of Patent: Apr. 6, 2004

(54) PRESSURE SENSOR HAVING METALLIC DIAPHRAGM SEAL MOUNT

(76) Inventors: Peter Gerst, Sieben Jucherten 2, D-79576 Weil am Rhein (DE); Karlheinz Banholzer, Am Sportplatz, D-79688 Hausen (DE); Karl Flögel, Blasistrasse 42, D-79650 Schopfheim (DE); Thomas Uehlin, Fuchsackerweg 6, D-79650 Schopfheim (DE); Frank Hegner, Chrischonastrasse 42, D-79540 Lörrach (DE); Elke Schmidt, Walstrasse 5, D-79650 Schopfheim (DE); Ulfert Drewes, Winzerstrasse 12 g, D-79379 Müllheim (DE); Rainer Martin, Burgunder Strasse 13, D-79588 Efringen-Kirchen (DE)

( * ) Notice: Subject to any disclaimer, the term of this patent is extended or adjusted under 35 U.S.C. 154(b) by 0 days.

(21) Appl. No.: 09/734,739

(22) Filed: Dec. 13, 2000

(65) Prior Publication Data

US 2001/0015105 A1 Aug. 23, 2001

(30) Foreign Application Priority Data

Feb. 22, 2000 (EP) .............................. 00103681

(51) Int. Cl.$^7$ ................................. G01L 7/08
(52) U.S. Cl. ..................................... 73/715
(58) Field of Search .................... 73/715, 716, 717, 73/718, 723, 724

(56) References Cited

U.S. PATENT DOCUMENTS

| 4,257,274 | A | * | 3/1981 | Shimada et al. ............... 73/718 |
| 4,542,435 | A | | 9/1985 | Freud et al. |
| 4,798,089 | A | * | 1/1989 | Frick et al. .................... 73/706 |
| 5,212,989 | A | | 5/1993 | Kodama et al. |
| 5,400,655 | A | * | 3/1995 | Tamai et al. ................... 73/706 |
| 5,465,626 | A | * | 11/1995 | Brown et al. .................. 73/715 |
| 5,656,780 | A | | 8/1997 | Park |
| 6,363,790 | B1 | * | 4/2002 | Flogel et al. ............ 361/283.4 |

FOREIGN PATENT DOCUMENTS

WO    WO 99/32866    7/1999

\* cited by examiner

*Primary Examiner*—Edward Lefkowitz
*Assistant Examiner*—Corey D. Mack
(74) *Attorney, Agent, or Firm*—Bacon & Thomas, PLLC

(57) ABSTRACT

A pressure sensor that is particularly suitable for the food industry and the measuring accuracy of which is stable over a long time, having a diaphragm seal with a separating diaphragm on which a pressure to be measured acts and having a ceramic measuring cell which is connected to the diaphragm seal exclusively by inorganic materials, is provided, in which sensor the separating diaphragm and all further sensor components coming into contact during measurement with a medium of which the pressure is to be measured are metallic.

6 Claims, 4 Drawing Sheets

PRESSURE SENSOR HAVING METALLIC DIAPHRAGM SEAL MOUNT

FIELD OF THE INVENTION

The invention relates to a pressure sensor.

BACKGROUND OF THE INVENTION

In pressure measurement technology, absolute- and relative-pressure sensors are used, for example. In the case of absolute-pressure sensors, a pressure to be measured is registered in absolute terms, i.e. as a pressure difference with respect to a vacuum. With a relative-pressure sensor, a pressure to be measured is picked up in the form of a pressure difference with respect to a reference pressure, for example a pressure which prevails where the sensor is located. In most applications, this is the atmospheric pressure at the place of use. Consequently, in the case of the absolute-pressure sensor a pressure to be measured is sensed in relation to a fixed reference pressure, the vacuum pressure, and in the case of the relative-pressure sensor a pressure to be measured is registered in relation to a variable reference pressure, for example ambient pressure.

Ceramic pressure-measuring cells are advantageously used in pressure measurement technology, since ceramic pressure-measuring cells have a measuring accuracy which is stable over a very long time. One reason for this is the solid ionic bonding of ceramic, which makes the material very durable and undergo virtually no ageing in comparison with other materials, for example metals. However, in comparison with metal, ceramic pressure sensors have a rougher surface and are often restrained by means of a generally nonreplaceble seal made of an organic material, for example an elastomer, in a pressure-tight manner in a housing which can then be fastened at a measuring location by means of a process connection.

In the food industry, pressure sensors which can be fitted such that they are flush at the front are used with preference, all sensor elements coming into contact with a medium of which the pressure is to be measured consisting of a metal, preferably of a stainless steel which can be cleaned very well.

In this branch of industry it is additionally of particular advantage if the pressure sensors have as few seals as possible. Seals consist of organic materials and, for reasons of hygiene, should therefore preferably be replaceable. In an ideal case, there is just a single seal for sealing off the process connection. In contrast to a seal belonging to the sensor, this seal, refereed to hereafter as the process seal, can be exchanged at any time by the user himself without any problem, in particular without any effect on the measuring accuracy of the pressure sensor.

SUMMARY OF THE INVENTION

It is an object of the invention to provide a pressure sensor which is suitable, inter alia, for the food industry and the measuring accuracy of which is stable over a long time.

For this purpose, the invention comprises a pressure sensor having
  a diaphragm seal with a separating diaphragm, on which a pressure to be measured acts, and
  a ceramic measuring cell, connected exclusively by inorganic materials to the diaphragm seal,
  in which the separating diaphragm and all farther sensor components coming into contact during measurement with a medium where pressure is to be measured are metallic.

According to one development, the measuring cell is fixed without restraint in a housing by being seated in the axial direction on a small tube, via which the ceramic measuring cell is connected to the diaphragm seal.

According to one development, the measuring cell has a measuring diaphragm, which subdivides an interior space of the measuring cell into a first chamber and a second chamber. The first chamber is connected to the diaphragm seal via a small tube, the first chamber, the small tube and the diaphragm seal are filled with a fluid, the fluid transfers a pressure acting on the separating diaphragm to the measuring diaphragm, a reference pressure in the second chamber acts on the measuring diaphragm, and the pressure sensor has an electromechanical transducer for registering a deflection of the measuring diaphragm dependent on the pressure and the reference pressure and for converting said deflection into an electrical output signal.

According to one embodiment, the reference pressure is a reference pressure prevailing in the ambience and the second chamber has an opening through which the reference pressure is introduced into the second chamber, or the second chamber is hermetically sealed and the reference pressure is an absolute pressure prevailing in the second chamber.

According to one embodiment, the measuring cell is additionally enclosed in the radial direction in a holder.

According to one embodiment, the holder has a body made of an elastomer, filling an intermediate space between the measuring cell and the housing.

According to another development, the ceramic measuring cell is fastened in a housing connected to the diaphragm seal. In this case, the housing preferably consists of a material which has a coefficient of thermal expansion which is approximately equal to the coefficient of thermal expansion of the ceramic of the measuring cell.

According to one development, the measuring cell is fastened in an insert which is arranged in a housing, is connected to the diaphragm seal and reaches around the measuring cell in a pot-like manner. According to a further development of the invention, the measuring cell is mounted without restraint and isostatically in a chamber filled with a fluid, surrounded on all sides by the fluid.

Investigations have shown that, in the case of a ceramic measuring cell restrained in a pressure-tight conventional way by means of an organic material, for example a seal made of an elastomer, diaphragm seals cannot be used without sacrificing considerable measuring accuracy. Changes in temperature and/or pressure can cause positional and/or dimensional changes of the seal, which are accompanied by a displacement of diaphragm seal fluid. In the case of a diaphragm seal, only a small amount of the diaphragm seal fluid is displaced when there is a change in pressure. If there are seal-related volume displacements of the same order of magnitude as pressure-related volume displacements, meaningful measurement is no longer possible.

Customarily used sealing materials are plastics, such as polytetrafluoroethylene or Viton for example. These materials are not gastight. If a negative pressure acts on the pressure sensor, air or gas can diffuse into the diaphragm-seal fluid through the seal from a side of the pressure sensor facing away from the diaphragm seal. Air or gas in the diaphragm-seal fluid greatly impairs the measuring accuracy of the pressure sensor.

On account of the way in which the connection of the diaphragm seal is made according to the invention, using connections made of inorganic materials, seals can be dispensed with completely. It is consequently possible for the first time to use a ceramic pressure-measuring cell in connection with a diaphragm seal and to utilize the advantages of ceramic measuring cells, that is their stable measuring accuracy over a very long time, in connection with a diaphragm seal.

Mechanical connections of inorganic materials may be, for example, welded or soldered connections, in particular active brazed connections. Such metallic joints offer the advantage that they are gastight and, in comparison with methods of connection by means of organic materials, such as by means of restrained seals for example, are mechanically immovable and to the greatest extent free from creepage. Consequently, in the case of a pressure sensor according to the invention, changes in pressure and/or temperature do not cause permanent deformation of the connecting materials at the connection points that could lead to a deterioration in the measuring accuracy. The measuring accuracy of the pressure sensors according to the invention can therefore be guaranteed over very long time periods.

A further advantage is that, in spite of the use of a ceramic pressure-measuring cell, apart from the process seal, only metallic materials come into contact with the medium of which the pressure is to be measured. Use of the diaphragm seal makes it possible for the metal contacted by the medium to be freely selected within wide limits, according to the mechanical and/or chemical properties of the medium.

There are also applications in which the diaphragm seal is fitted directly at the measuring location in a so-called welded neck, i.e. a neck welded onto the container. In welded necks, the sealing usually takes place purely metallically, for example by means of sealing cones. In these cases, even the process seal is omitted.

The invention and further advantages are now explained in more detail with reference to the figures of the drawing, in which four exemplary embodiments are represented. The same elements are provided with the same reference numerals in the figures.

DETAILED DESCRIPTION OF THE PREFERRED EMBODIMENTS

Figure 1:
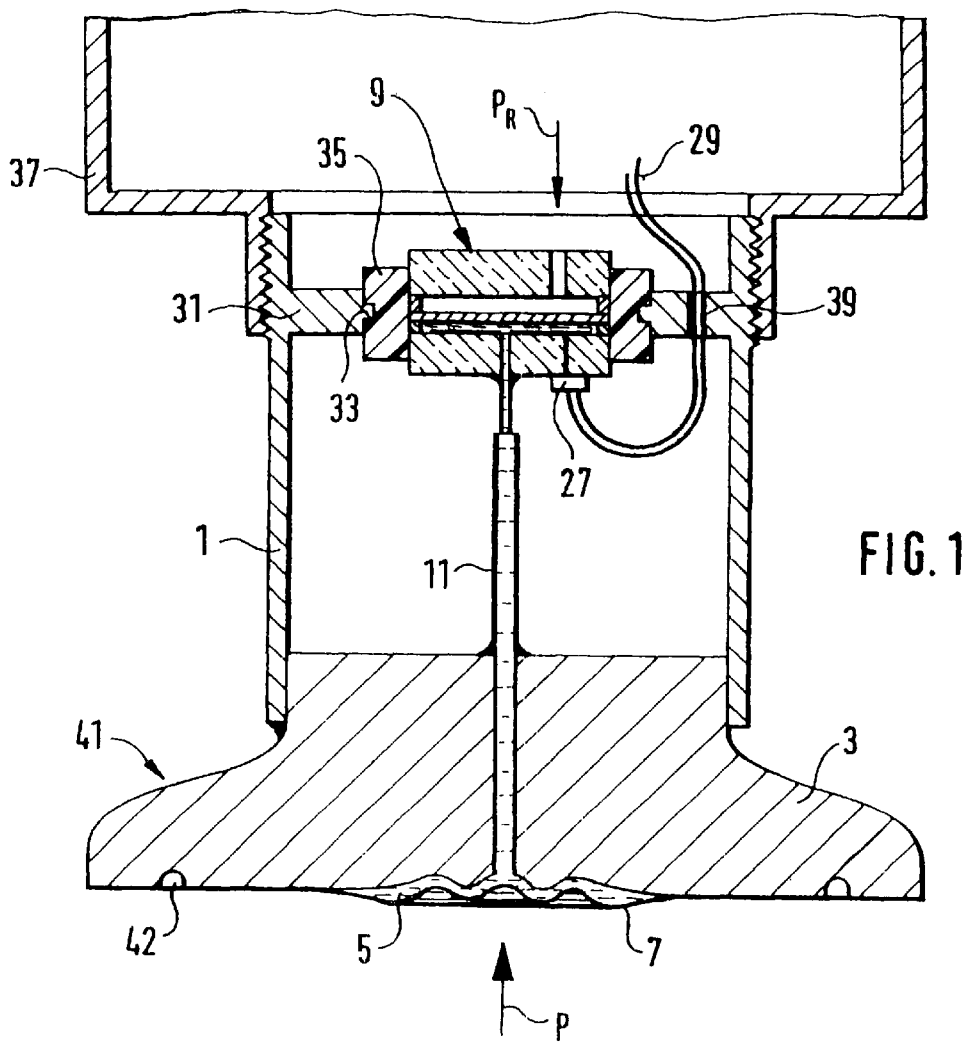
FIG. 1 shows a section through a pressure sensor according to the invention, in which a ceramic measuring cell is fixed on a small tube, by means of which it is connected to a diaphragm seal.

In FIG. 1, a section through a pressure sensor according to the invention is represented. The pressure sensor comprises an essentially cylindrical housing 1, in the one end of which a diaphragm seal 3 is enclosed. It is welded into the housing 1. The diaphragm seal 3 has a chamber 5, which is filled with a fluid and closed by a separating diaphragm 7. During operation, a pressure P to be measured, which is indicated in FIG. 1 by an arrow, acts on the separating diaphragm 7.

Arranged in the housing 1 is a ceramic measuring cell 9, which is connected to the chamber 5 of the diaphragm seal 3 via a small tube 11 filled with the fluid.

Figure 2:
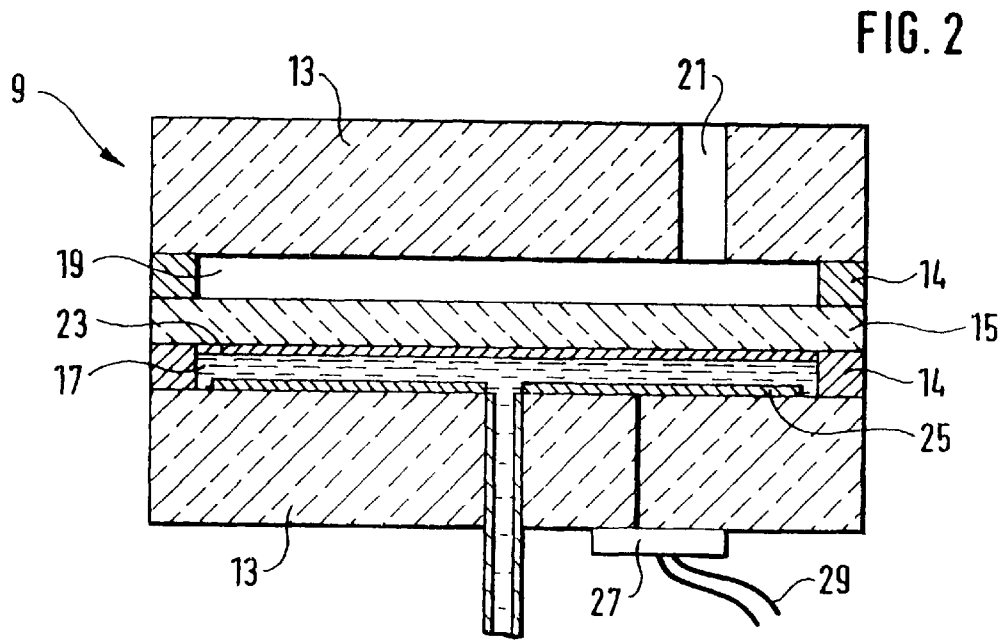
FIG. 2 shows an enlarged representation of the measuring cell from FIG. 1.

FIG. 2 shows an enlarged representation of the measuring cell 9. It comprises two cylindrical basic bodies 13 and a measuring diaphragm 15 enclosed between the two basic bodies.

The measuring cell 9 is a ceramic measuring cell, i.e. the basic bodies 13 and the diaphragm 15 consist of ceramic. The measuring diaphragm 15 is connected in a pressure-tight and gas-tight manner to each of the basic bodies 13, at its edge facing the respective basic body 13, by means of a joining location 1. For example, a suitable material for the joining location is an active brazing solder. The measuring diaphragm 15 is pressure-sensitive, i.e. a pressure acting on it causes a deflection of the measuring diaphragm 15 from its position of rest.

The measuring diaphragm 15 and the joining locations 14 subdivide an interior space of the measuring cell 9 into a first chamber 17 and a second chamber 19. The ceramic measuring cell 9 is connected to the diaphragm seal 3 exclusively by inorganic materials. Suitable for example for this are connecting or joining techniques such as soldering or welding. In the exemplary embodiment represented in FIG. 1, the first chamber 17 is connected to the diaphragm seal 3 via the small tube 11. The small tube 11 is, for example, welded onto the diaphragm seal 3 and fastened to the basic body 13 by a soldered connection. No seal of an organic material is required.

Just like the diaphragm seal 3 and the small tube 11, the first chamber 17 is filled with fluid. A pressure P acting on the separating diaphragm 7 is transferred by the fluid to the measuring cell 3 into the first chamber 17. The fluid is as incompressible as possible and has a coefficient of thermal expansion that is as low as possible. Suitable for example are commercially available silicone oils. In addition, the filling amount required is preferably to be kept low, by the small tube 11 having a small diameter and the diaphragm seal 3 in the chamber 5 having a diaphragm bed which mimics the shape of the separating diaphragm 7 and is arranged at a small distance from the separating diaphragm 7.

For the case in which the pressure sensor is to be used in hazardous locations where there is a risk of explosion, a flame barrier may be arranged in the small tube 11 or the small tube 11 may itself be dimensioned in such a way as to form a flame barrier. The construction of such a flame barrier can be taken from national safety regulations and standards on explosion protection.

In the exemplary embodiment represented ion FIGS. 1 and 2, the second chamber 19 has an opening 21, in this case a bore penetrating the basic body 13, through which a reference pressure is introduced into the second chamber 19. The reference pressure is a reference pressure $P_R$ prevailing in the pressure sensor, in this case an ambient pressure. This is thus a relative-pressure sensor.

Instead of the ambient pressure, a variable pressure may also be introduced into the second chamber 19, for example via a second diaphragm seal, connected in an analogous way to the diaphragm seal 3. In this case, the deflection of the measuring diaphragm is dependent on the difference between the two pressures acting on it.

The pressure sensor according to the invention may of course also be designed as an absolute-pressure sensor. In this case, the second chamber 19 is evacuated and hermetically sealed and the reference pressure is an absolute pressure prevailing in the second chamber 19. The measuring cell 9 has an electromechanical transducer for registering a deflection of the measuring diaphragm 15 dependent on the pressure P and the reference pressure and for converting said deflection into an electrical output signal.

In the exemplary embodiment represented in FIGS. 1 and 2, the electromechanical transducer comprises a capacitor, which has a measuring electrode 23, arranged in the first chamber 17 on the measuring diaphragm 15, and a counterelectrode 25, arranged opposite the measuring electrode 23 on an inside wall of the first chamber 17, on the basic body 13. The capacitance of the capacitor depends on the distance of the measuring electrode 23 and the counterelectrode 25 in relation to one another and is consequently a measure of the deflection of the measuring diaphragm 15.

The measuring electrode 23 is electrically contacted through the joining location 14 and is connected outside, for example to ground. The counterelectrode 25 is electrically contacted through the basic body 13, to the outer side of the latter, and leads to an electronic circuit 27 arranged on the basic body 13. Measuring electrode 23 and counterelectrode 25 form a capacitor and the electronic circuit 27 converts the changes in capacitance of the capacitor, for example into a correspondingly changing electrical voltage. The output signal is available for further processing and/or evaluation via connecting leads 29.

If the pressure sensor is to be used at very high temperatures, it is recommendable to arrange the electronic circuit 27 at some distance from the diaphragm seal 3 and the ceramic measuring cell 9. It is also possible of course for more electrodes to be arranged in the first chamber 17, on the basic body 13 and/or on the measuring diaphragm 15. For example, a circular-disk-shaped inner electrode and an outer annular-disk-shaped electrode surrounding the latter may be provided instead of the counterelectrode 25.

The outer electrode together with the measuring electrode 23 would form a second capacitor, the capacitance of which may serve for compensating purposes, while the inner electrode together with the measuring electrode 23 has a capacitance dependent on the pressure and on the reference pressure.

However, piezoresistive elements or strain gauges arranged on the measuring diaphragm 15 in the first chamber 17 can also be used as electromechanical transducers.

A great advantage of the pressure sensor described above when designed as a relative-pressure sensor is that the electromechanical transducer is completely protected against moisture, for example condensate, and contaminants. Moisture and/or contaminants, as are typically contained in the atmosphere and in the pressure sensor, can be deposited only in the second chamber 19. By contrast, the first chamber 17, which contains the electromechanical transducers sensitive to moisture and/or contaminants, is closed from the environment.

The measuring cell 9 is fixed in the housing 1, by being seated in the axial direction on the small tube 11, via which the ceramic measuring cell 9 is connected to the diaphragm seal 3. In addition, it is enclosed in the radial direction in a holder. Pressure-resistant restraint, as is required in the case of conventional ceramic pressure-measuring cells, is not necessary in the case of the pressure sensor according to the invention, since the pressure P is introduced through the diaphragm seal into the first chamber 17 and consequently exerts only a very small overall force on the measuring cell 9 via the thin small tube 11. A restraint generally causes a reaction, in particular a pressure- and temperature-dependent reaction, on the measuring cell.

In particular if the restraint causes a reaction on the measuring diaphragm, this may lead to a change in sensor data of the pressure sensor, for example its zero point or its characteristic temperature data and thus to measurement errors.

The fitting of the ceramic measuring cell 9 without restraint has the effect of improving still further the measuring accuracy of ceramic measuring cells, which is in any case very stable over a long time in comparison with other measuring cells.

In the case of the exemplary embodiment represented in FIG. 1, there is formed onto the housing 1, at the level of the measuring cell 9, a radially inwardly extending shoulder 31, on the inner circumferential surface of which there is arranged a spring 33 running around the periphery in an annular form. An intermediate space existing between the housing 1 and measuring cell 9 is filled by a body 35 made of elastomer. The body 35 has a groove which runs around the outside periphery in an annular form and into which the spring 33 of the shoulder 31 loosely engages. The body 35 reaches around the measuring cell 9 and prevents a deflection in the radial direction of the measuring cell 9 seated on the small tube 11. In the axial direction, on the other hand, the measuring cell 9 is movable, in order to be able to compensate for differences in thermal expansion.

The housing 1 is adjoined in the direction away from the diaphragm seal by a connection housing 37. In the exemplary embodiment shown, the connection housing 37 is screwed onto the housing 1. Arranged in the connection housing 37 there are, for example, continuing electronics, which are not represented in FIG. 1 and in which the measuring signals are preprocessed. The shoulder 31 has at the side a bore 39, through which the connecting leads 29 are led. The measuring signals are accessible for further processing and/or evaluation via the connecting leads 29.

On a side facing away from the measuring cell 9, the diaphragm seal 3 is designed as a process connection 41. The process connection 41 serves the purpose of fastening the pressure sensor at a measuring location. In the exemplary embodiment shown, the process connection 41 is a standard connection, as defined in the international standard ISO 2852. This connection is known in measuring technology by the trade name 'Triclamp'. Other types of fastening can likewise be used. The separating diaphragm 7 terminates flush at the front with the process connection 41 and forms a pressure- and gastight termination with respect to the process. Other types of fastening, for example by means of a flanged or screwed connection, can likewise be used.

A pressure P prevailing at the measuring location acts directly on the separating diaphragm 7 and is transferred via the diaphragm seal 3 and the fluid in the small tube 11 into the measuring cell 9.

The separating diaphragm 7 and all further sensor components coming into contact during measurement with a medium whose pressure is to be measured, in the exemplary embodiment shown i.e. the process connection 41, are metallic.

Metal offers the great advantage here that such a sensor can be fitted such that it is flush with the front and consequently can be cleaned well.

The pressure sensor according to the invention offers the advantage that the pressure sensor itself manages completely without a seal coming into contact with the medium. Only a single seal, that is a process seal for sealing off the measuring location from the ambience, is required. The process connection 41 has a groove 42 running around the periphery in an annular form for receiving this process seal, which is not represented in FIG. 1. The process seal can be exchanged at any time without any problem and an exchange of the process seal has no influence on the measuring accuracy of the pressure sensor whatsoever.

In some applications, it is possible to fit the pressure sensor according to the invention directly in a so-called welded neck, i.e. a neck welded onto the container. In welded necks, sealing usually takes place purely metallically, for example by means of sealing cones. This offers the advantage over the process connection 41 represented that the pressure sensor is not only arranged such that it is flush at the front but also manages entirely without seals, even without a process seal.

The pressure sensor is therefore very good for applications in the food industry, where the requirements for cleanability, freedom from seals and for metallic materials are given particularly high importance.

The measuring cell 9 represented in FIGS. 1 and 2 is a relative-pressure measuring cell. The pressure P to be measured is registered in relation to the reference pressure, the reference pressure in this case being the variable ambient pressure. An absolute-pressure sensor may also be constructed in an entirely analogous way to the relative-pressure sensor described above. In the case of such an absolute-pressure sensor, the opening 21 is omitted, and the second chamber 19 is evacuated. In a corresponding way, the reference pressure is then the fixed vacuum pressure in the second chamber.

Figure 3:
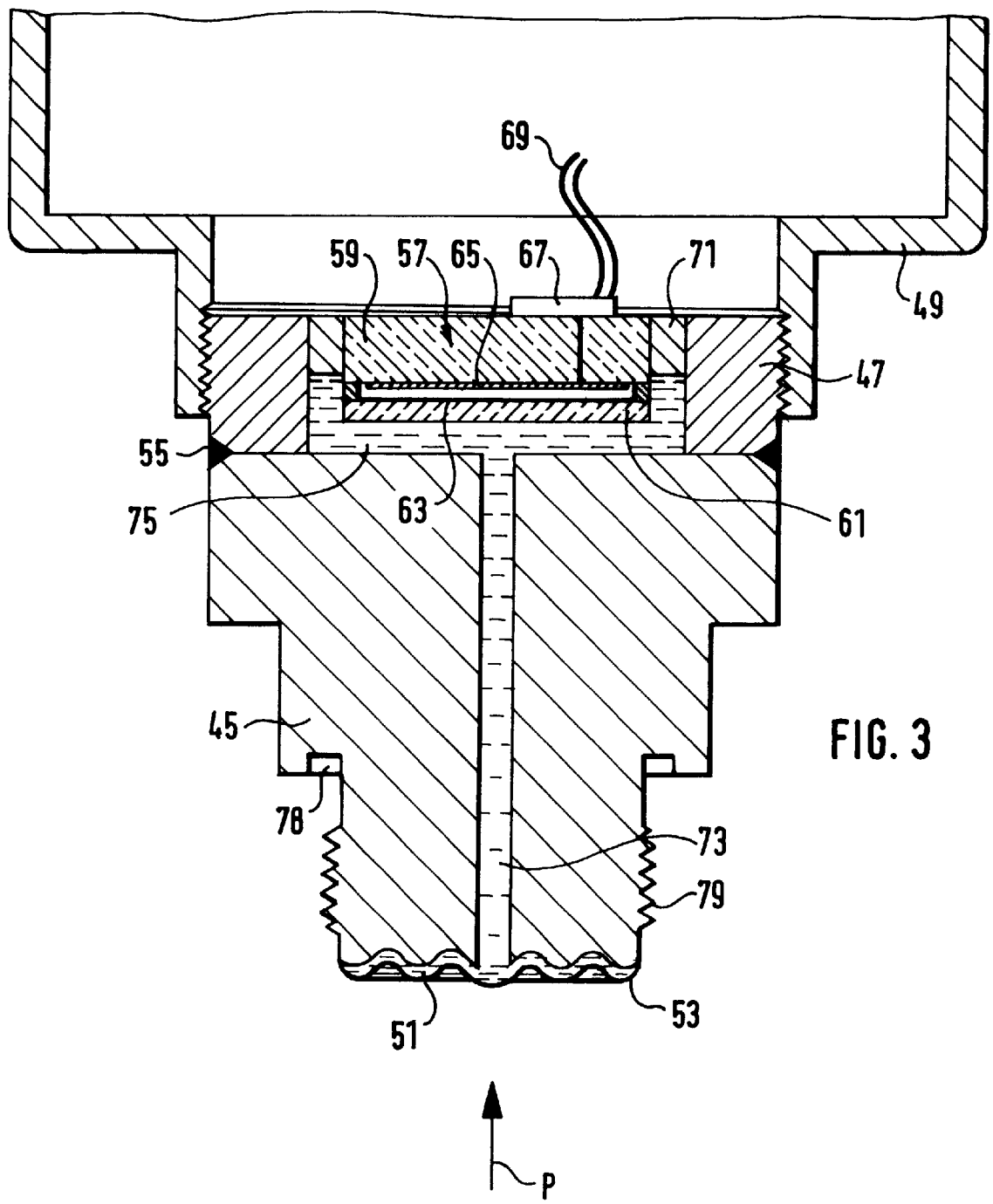
FIG. 3 shows a section through a further pressure sensor according to the invention, in which a ceramic measuring cell is fastened in a housing.

FIG. 3 shows a section through a second exemplary embodiment of a pressure sensor according to the invention. It has a metallic diaphragm seal 45, adjacent to which there is a housing 47 and a connection housing 49, connected to the housing 47.

The diaphragm seal 45 is essentially cylindrical and has at the end a chamber 51, which is filled with a fluid and closed by a metallic separating diaphragm 53. The diaphragm seal 45 and the separating diaphragm 53 preferably consist of a high-grade and corrosion-resistant stainless steel. During operation, a pressure P to be measured, which is indicated in FIG. 3 by an arrow, acts on the separating diaphragm 53.

The housing 47 is cylindrical and rests with a circular-annular base surface on a circular-annular end face of the diaphragm seal 45 facing away from the separating diaphragm. Housing 47 and diaphragm seal 45 are either a single component or are connected to one another by a connection 55 made of an inorganic material.

Arranged in the housing 47 is a ceramic measuring cell 57. In the exemplary embodiment shown, the measuring cell 57 is a capacitive ceramic absolute-pressure measuring cell. Alternatively, a relative-pressure measuring cell may of course also be used. The measuring cell 57 has a basic body 59 and a measuring diaphragm 61. The basic body 59 and the measuring diaphragm 61 consist of ceramic. The measuring diaphragm 61 and the basic body 59 are connected in a pressure-tight and gastight manner to one another at their edge by means of a joining location, thereby forming a measuring chamber. The measuring diaphragm 61 is pressure-sensitive, i.e. a pressure acting on it causes a deflection of the measuring diaphragm 61 from its position of rest.

Arranged on one inner side of the measuring diaphragm 61 is an electrode 63 and arranged on an opposite inner side of the basic body 59 is at least one counterelectrode 65. The electrode 63 of the measuring diaphragm 61 is electrically contacted by the joining location and is connected on the outside, for example, to ground. The counterelectrode 65 of the basic body 59 is electrically contacted through the basic body 59 to the outer side of the latter and leads to an electronic circuit 67 arranged on the basic body 59. Electrode 63 and counterelectrode 65 form a capacitor, and the electronic circuit 67 converts the changes in capacitance of the capacitor, for example into a correspondingly changing electrical voltage. The measured variable is available for further processing and/or evaluation via connecting leads 69.

The ceramic measuring cell 57 is fastened in the housing 47 by means of a connection made of an inorganic material 71. In the exemplary embodiment shown, the ceramic measuring cell 57 and the housing 47 are cylindrical and arranged coaxially in relation to one another, so that the housing 47 surrounds the measuring cell 57. The connection 71 is preferably arranged in an annular-cylindrical gap between the housing 47 and the basic body 59. This achieves the effect that the sensitive measuring diaphragm 61 remains essentially free from restraint.

The housing 47 preferably consists of a material which has a coefficient of thermal expansion which is approximately equal to the coefficient of thermal expansion of the ceramic of the measuring cell 57. If, for example, a measuring cell made of an aluminum oxide is used, nickel-iron-cobalt alloys, as are commercially available for example under the product name Vacon or Kovar, are suitable materials for the housing 47. Alternatively, the housing 47 may, however, also likewise consist of a ceramic, for example an aluminum oxide. Such a suitable choice of material achieves the effect that only very low forces are exerted on the measuring cell 57 by the housing 47, even when there are strong fluctuations in temperature.

In the case of a metallic housing 47, the connection 55 may be, for example, a welded connection and the connection 71 may be, for example, a metallic joint, for example with an active brazing solder. In the case of a housing 47 made of ceramic, the connections 55 and 71 may be metallic joints, for example with an active brazing solder. The ceramic measuring cell 57 is connected to the diaphragm seal 45 via the connections 55 and 71 exclusively by inorganic materials. In the case of this exemplary embodiment as well, the pressure sensor itself has no seals whatsoever. All that is required is a single process seal, which can be exchanged without any effects on the measuring accuracy and is not represented in FIG. 2.

The diaphragm seal 45 has a through-bore 73, the one end of which opens out into the chamber 51 and the other end of which opens out in a chamber 75 bounded by the housing 47 and the measuring cell 9. The chamber 51, the bore 73 and the chamber 75, as well as an interior space of the housing 47, facing the diaphragm seal 45 in front of the measuring cell 57, are filled with a fluid that is as incompressible as possible, for example a silicone oil.

By means of the bore 73 and the metallic connections between the diaphragm seal 45 and the housing 47, as well as between the housing 47 and the measuring cell 57, the ceramic measuring cell 57 is connected to the diaphragm seal 45 by inorganic materials. A pressure P acting on the separating diaphragm 53 is transferred by the fluid to the measuring diaphragm 61, and a deflection of the measuring diaphragm 61 dependent on the absolute pressure to be measured is registered by the capacitive electromechanical transducer described above and converted by the electronic circuit 67 into an electrical measured variable.

Instead of the capacitive ceramic measuring cell described, a piezoresistive measuring cell may also be used, for example. In the case of these types of measuring cells, the transducer has strain gauges applied to the measuring diaphragm. In the case of these measuring cells, the measuring chamber may also be formed by the basic body, on which the measuring diaphragm is fastened by its outer edge, and the measuring diaphragm itself.

Of course, a relative-pressure measuring cell may also be used instead of the absolute-pressure measuring cell described.

The diaphragm seal 45 has at its end facing away from the measuring cell an external thread 79, by means of which the pressure sensor can be screwed at a measuring location into a corresponding opening such that it is flush at the front. The diaphragm seal 45 consequently serves at the same time as a process connection. Above the external thread 79, the diaphragm seal 45 has an annular shoulder surface, in which a peripheral groove 78 for receiving the process seal is provided.

In the case of the exemplary embodiment represented in FIG. 3 as well, the separating diaphragm 53 and all further sensor components coming into contact during measurement with a medium of which the pressure P is to be measured, in this case only the external thread 79, are metallic.

Figure 4:
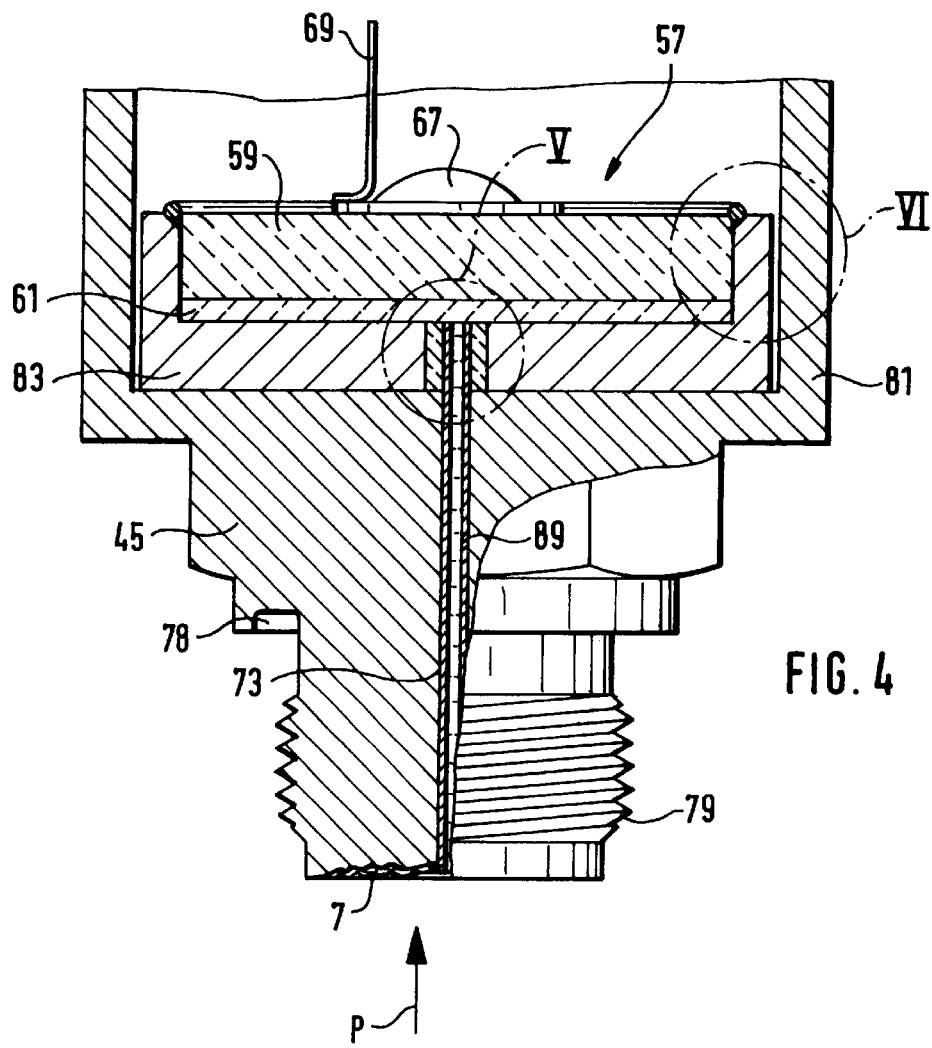
FIG. 4 shows a partially sectioned view of a pressure sensor, in which a ceramic measuring cell is arranged in an insert in a housing.

FIG. 4 shows a partially sectioned view of a further exemplary embodiment of a pressure sensor according to the invention. The pressure sensor has a diaphragm seal 45 with a separating diaphragm 7, on which a pressure P to be measured acts, which seal is identical to the diaphragm seal 45 represented in FIG. 3. The separating diaphragm 7 and all further sensor components coming into contact during measurement with a medium of which the pressure P is to be measured, in this case the external thread 79, are metallic.

Formed onto the diaphragm seal 45 in the direction away from the separating diaphragm is a housing 81, which has a cylindrical interior space.

Arranged in housing 81 is a pot-shaped insert 83, which is connected to the diaphragm seal 45 and serves for receiving the ceramic measuring cell 57. In the exemplary embodiment shown, the measuring cell 57 corresponds to the measuring cell 57 represented in FIG. 3. The other ceramic measuring cells can of course also be used.

The insert 83 reaches around the ceramic measuring cell 57 in a pot-like manner. In this case, the measuring diaphragm 61 rests with an outer pressure-insensitive edge on a narrow shoulder ring 85, which runs around the inside periphery of the insert 83 and can be seen in the enlargement represented in FIG. 6.

The insert 83 preferably consists of a material of which the coefficient of thermal expansion is approximately equal to the coefficient of thermal expansion of the ceramic. Suitable materials are, for example, ceramic or iron-nickel-cobalt alloys, as are available under the trade name Vacon or Kovar.

Figure 6:
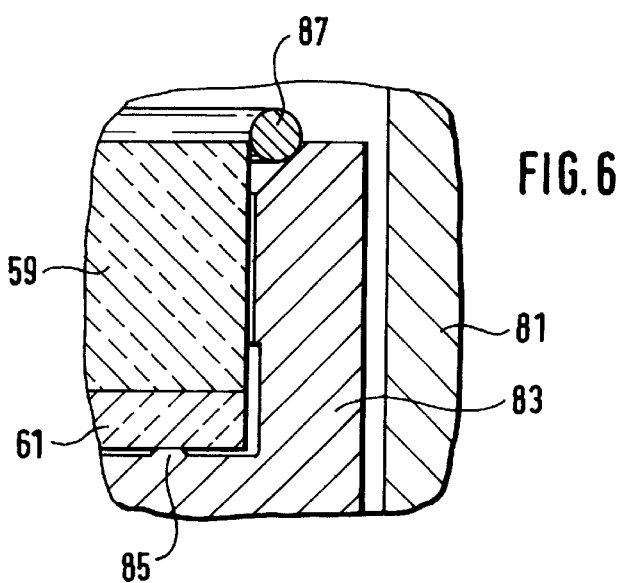
FIG. 6 shows an enlargement of the joining location between the housing and the measuring cell from FIG. 4.

The ceramic measuring cell 57 is connected at an outer cylindrical edge, facing away from the measuring diaphragm, to the insert 83 by means of an inorganic material. This may take place, for example, by a soldered connection. FIG. 6 shows an enlargement of the connecting point between the housing and the measuring cell 57 from FIG. 4. A solder ring 87, which is introduced into a recess between the insert 83 and the measuring cell 57, is represented. During the soldering operation, the solder becomes liquid and fills a narrow annular-cylindrical gap existing between the measuring cell 57 and the insert 83.

The diaphragm seal has a bore 73, into which a small tube 89 is admitted. The small tube 89 is continued on a side of the diaphragm seal 45 facing away from the separating diaphragm and is led through the insert 83.

At its end facing the separating diaphragm, the small tube 89 is welded into the diaphragm seal 45. The insert 83 is fastened on one end of the small tube 89, facing away from the separating diaphragm, to minimize mechanical stresses, as can occur on account of different coefficients of expansion of the housing 81, insert 83 and measuring cell 57. There is preferably not a mechanically fixed connection between the insert 83 and the housing 81.

The small tube 89, the chamber of the diaphragm seal and a hollow space, surrounding the measuring cell 57 in the insert 83, are fluid-filled. The fluid transfers a pressure P acting on the separating diaphragm to a measuring diaphragm of the ceramic measuring cell 57.

Figure 5:
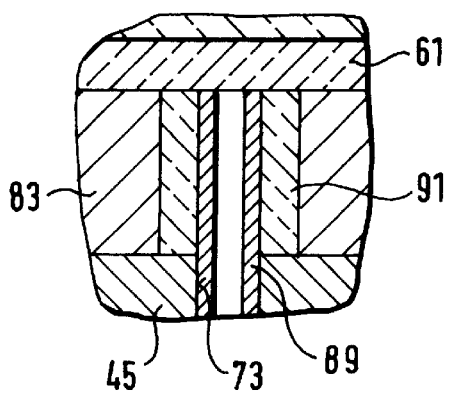
FIG. 5 shows an enlargement of the lead-through of a small tube filled with fluid through the insert from FIG. 4.

FIG. 5 shows an enlargement of the lead-through of the small tube 89 through the insert 83. The small tube 89 preferably consists of an iron-nickel-cobalt alloy, for example made of one of the materials already mentioned Vacon or Kovar, and is led through the insert 83 in a ceramic ring 91 metallized on both sides. The ceramic ring 91 causes an electrical insulation between the housing 81 and the insert 83. The ceramic ring 91 is, for example, connected to the insert 83 and the small tube 89 by soldering.

The ceramic measuring cell 57 is connected to the diaphragm seal 45 via the small tube 89 and the connection between the measuring cell 57 and the insert 83 exclusively by means of inorganic materials.

Figure 7:
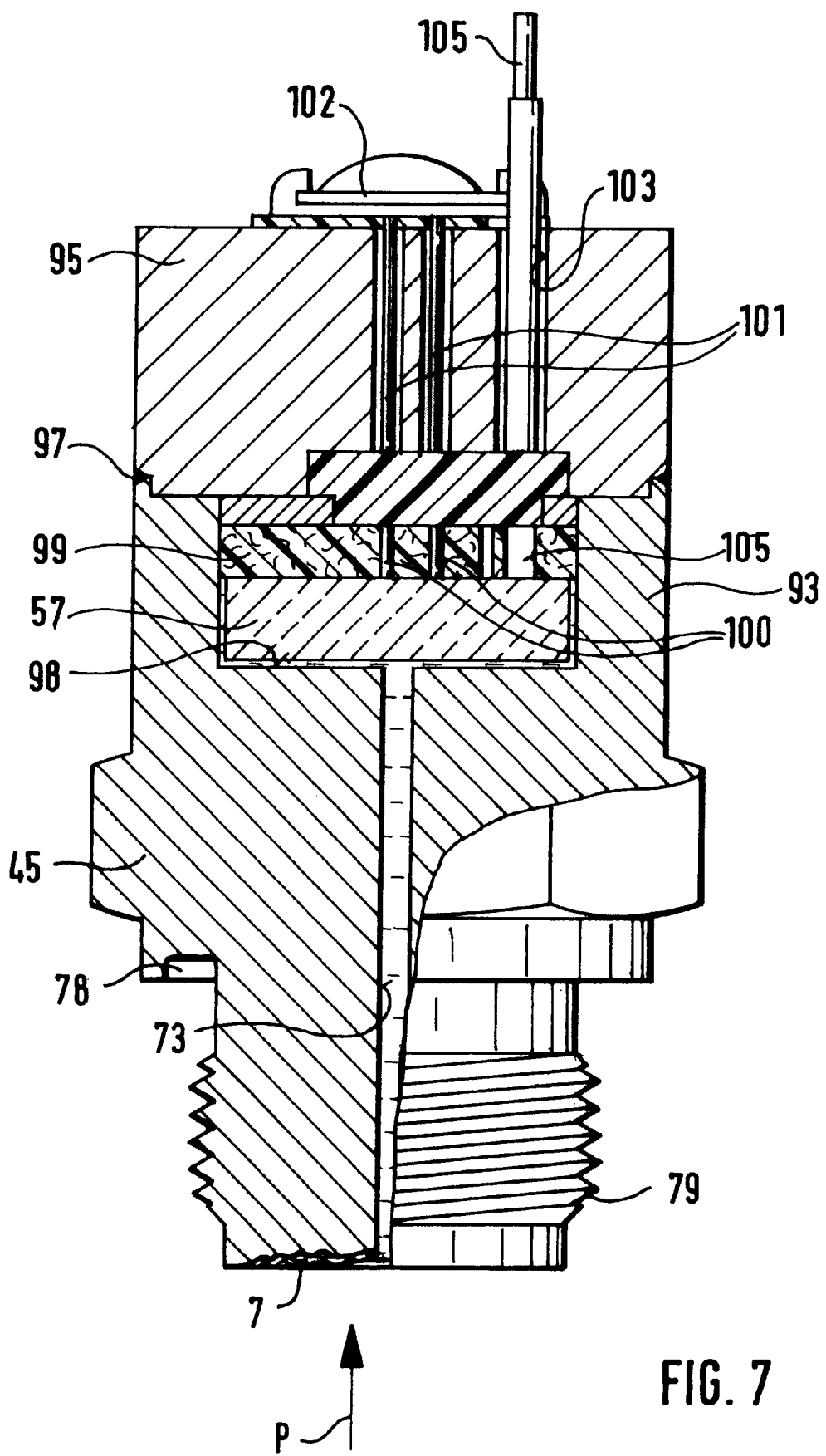
FIG. 7 shows a pressure sensor in which the measuring cell is mounted in a chamber filled with a fluid.

FIG. 7 shows a partially sectioned view of a further exemplary embodiment of a pressure sensor according to the invention. In the case of this exemplary embodiment as well, the diaphragm seal 45 and the ceramic measuring cell 57 are designed essentially according to the exemplary embodiments represented in FIGS. 3 and 4.

Formed onto the diaphragm seal 45 is a cylindrical housing 93, which is terminated by a cover 95. Housing 93 and cover 95 preferably consist of a metal and are connected to one another by a welded connection 97. The interior space of the housing 93 forms a chamber 98, in which the ceramic measuring cell 57 is arranged. Here, too, the diaphragm seal 45 has a through-bore 73, through which the chamber 98 is connected to the chamber of the diaphragm seal 45 lying behind the separating diaphragm 7. The chamber of the diaphragm seal 45, the bore 73 and the chamber 98 in which the measuring cell 57 is arranged are filled with a fluid that is as incompressible as possible and has a coefficient of thermal expansion that is as low as possible, for example a silicone oil.

Introduced into a hollow space existing on a side of the ceramic measuring cell 57 facing away from the separating diaphragm is a filling body 99, which serves the purpose of minimizing the free volume and consequently the required amount of fluid.

In the chamber 98, the measuring cell 57 is surrounded on all sides by the fluid. The fluid forms an isostatic mounting for the measuring cell 57 which is completely free of restraint and in which the measuring cell 57 is exposed to the same pressure on all sides. This mounting of the ceramic measuring cell 57 improves still further the measuring accuracy of ceramic measuring cells, which is in any case very stable over a long time in comparison with other measuring cells.

The electrical connection of the ceramic measuring cell 57 takes place by means of contact pins 100 which are connected to the electromechanical transducer, soldered onto the basic body and connected to lead-throughs 101 led through the cover 95. On the cover 95, an electronic circuit 102 for receiving the measuring signals of the electromechanical transducer is connected to the lead-throughs 101.

For the case in which a relative-pressure measuring cell is used, the cover 95 has an additional lead-through 103, which is represented in FIG. 7 and through which a pressure supply line 105 is led right into the ceramic measuring cell 57. A reference pressure, for example an ambient pressure, is supplied via this pressure supply line 105.

In the case of the exemplary embodiments represented in FIGS. 4 and 7 as well, the connection of the ceramic measuring cells 57 to the diaphragm seal 45 by means of inorganic materials makes polymer seals superfluous for the pressure-resistant restraint of the measuring cells. Consequently, the very good long-term stability of the ceramic pressure-measuring cells is not impaired by organic seals.

What is claimed is:

1. An absolute-pressure sensor or relative-pressure sensor for sensing a pressure with respect to vacuum or with respect to ambient pressure, respectively, said absolute-pressure sensor or relative-pressure sensor, having:
    a housing;
    a diaphragm seal with a separating diaphragm on which a pressure to be measured acts;
    an elongated tube; and
    a ceramic measuring cell fixed in said housing by being mounted in the axial direction on said elongated tube, and through which said ceramic measuring cell is connected to said diaphragm seal, wherein:
        said ceramic measuring cell is connected exclusively by inorganic materials to said diaphragm seal; and
        said separating diaphragm and all sensor components coming into contact during measurement with a medium, the pressure of which is to be measured, are metallic.

2. The pressure sensor as defined in claim 1, further having:
    An electromechanical transducer for registering a deflection of said measuring diaphragm depending on said pressure to be measured and a reference pressure, and for converting said deflection into an electrical output signal, wherein:
        said ceramic measuring cell has an internal space and a measuring diaphragm which subdivides said internal space into a first chamber and a second chamber;
        said first chamber is connected to said diaphragm seal by said elongated tube;
        said first chamber, said elongated tube and said diaphragm seal are filled with a fluid, which transfers said pressure acting on said separating diaphragm to said measuring diaphragm; and
        said reference pressure acts on said measuring diaphragm in said second chamber.

3. The pressure sensor as defined in claim 2, wherein:
    said second chamber has an opening through which said reference pressure is introduced to said second chamber; and
    said reference pressure is ambient.

4. The pressure sensor as defined in claim 2, wherein:
    said second chamber is hermetically sealed; and
    said reference pressure is an absolute pressure prevailing in said second chamber.

5. The pressure sensor as defined in claim 1, further having:
    a holder, wherein:
        said ceramic measuring cell is additionally enclosed in the radial direction in said holder, said holder providing a constraint against deflection in the radial direction of said measuring cell on said elongated tube.

6. The pressure sensor as defined in claim 5, wherein:
    said holder has a body made of an elastomer filling an intermediate space between said ceramic measuring cell and said housing.

* * * * *